United States Patent [19]

Chappuis

[11] Patent Number: 5,340,632
[45] Date of Patent: Aug. 23, 1994

[54] PADDING ELEMENT FOR THE PACKING OF OBJECTS AND DEVICE FOR THE MANUFACTURING OF THE SAME

[76] Inventor: Michel Chappuis, Hofacherweg 2, 3423 Ersigen, Switzerland

[21] Appl. No.: 960,467

[22] PCT Filed: Apr. 19, 1992

[86] PCT No.: PCT/CH92/00087

§ 371 Date: Dec. 16, 1992

§ 102(e) Date: Dec. 16, 1992

[87] PCT Pub. No.: WO92/19436

PCT Pub. Date: Dec. 11, 1992

[30] Foreign Application Priority Data

May 3, 1991 [CH] Switzerland ................ 1337/91
Oct. 29, 1991 [EP] European Pat. Off. ....... 91810835.8

[51] Int. Cl.$^5$ ...................................... B32B 9/00
[52] U.S. Cl. ........................................ 428/71; 428/43; 428/116; 428/119; 428/178; 428/192; 428/198; 206/521; 206/522; 156/497; 156/543
[58] Field of Search ............... 206/522, 521; 428/43, 428/178, 71, 119, 116, 180, 192, 198; 156/497, 543, 553, 555

[56] References Cited

U.S. PATENT DOCUMENTS

| | | | |
|---|---|---|---|
| 3,087,845 | 4/1963 | Patterson | 154/53 |
| 3,575,757 | 4/1971 | Smith | 156/147 |
| 3,768,724 | 10/1973 | Hill | 229/53 |
| 3,817,803 | 6/1974 | Horsky | 428/166 |
| 4,029,539 | 6/1977 | Doll | 156/515 |
| 4,169,002 | 9/1979 | Larson | 156/145 |
| 4,551,379 | 11/1984 | Kerr | 428/200 |
| 4,553,377 | 11/1985 | Klinkel | 53/548 |
| 4,769,106 | 9/1988 | Busching | 156/497 |

FOREIGN PATENT DOCUMENTS 991671 10/1951 France.

*Primary Examiner*—Patrick J. Ryan
*Assistant Examiner*—Abraham Bahta
*Attorney, Agent, or Firm*—Oliff & Berridge

[57] ABSTRACT

The Padding Element is created by two synthetic foil runs (1, 2) arranged one over the other and which are connected by means of first welding seams (3) and second welding seams (4). In each case two adjacent first welding seams (3) and second welding seams (4) create a chamber which during the manufacturing process of the Padding Element can remain unfilled with air, be partially filled with air, or completely filled with air, as required. In this manner Padding Elements can be produced with configurations individually adaptable to the object to be packed (6). The Padding Element is preferably used for at least three-sided enclosure of the object to be packed (6) and comprises, rather like a book cover, a top cover (7), a back (9) and a bottom cover (8). The Padding Element offers the advantage of requiring little material to create appropriately configured packing elements, with all the corresponding benefits, whereby space-saving disposal after use is effected by slitting open the air-filled chambers. As it is intended to produce the Padding Elements on a Device installed close to their place of use, on an as-required basis, storage space requirements for packing material will be practically negligible.

18 Claims, 4 Drawing Sheets

PADDING ELEMENT FOR THE PACKING OF OBJECTS AND DEVICE FOR THE MANUFACTURING OF THE SAME

The invention on hand pertains to a Padding Element for the packing of objects, comprising two synthetic foil runs placed one upon the other and joined by way of welding seams. The invention furthermore comprises a Device for the manufacture of a Padding Element with a contrivance to provide synthetic foil feed and a contrivance for the welding of the same.

Materials customarily used in the packing and/or padding out of goods include Styropor chips, Styropor mouldings and synthetic mats with air cushions of various sizes produced in a deep-drawing process.

Styropor mouldings are relatively expensive to make, and are primarily used to pack identical objects manufactured in large series. Such mouldings are bulky and use up quite a lot of storage space; furthermore, getting them to the right place, at the right time, requires a great deal of time and effort. The packing/padding problem can be solved more efficiently e.g. by using the familiar Styropor chips, whereby such chips can be stored in silos at the packing station and used to fill out the space between the object to be packed and the container. However, most of us are adequately familiar with the problems encountered when unpacking goods delivered in Styropor mouldings or Styropor chips. More often than not, the object is covered in electrostatically charged Styropor particles, which are exceedingly difficult to remove. And private households in particular face a further dilemma: what to do with the Styropor packing material. In most cases, it will end up with the household refuse.

Aforementioned synthetic mats with air cushions can be cut off to the required lengths, for example from large rolls, at the point of packing. The object to be packed is then wrapped once or several times around and then inserted into the transport container. It might then be necessary to use more mat sections to fill out any remaining hollow spaces in the container. This method is too complicated to be applied to large-series goods, and problems can also be encountered with the disposal of the mats as many communities require the payment of a by-volume waste disposal charge. Nobody would even dream of attempting to reduce their waste volumes by cutting open the many hundreds (or thousands) of air cushions that make up such mats, thus permitting the air to escape.

The invention described herein is designed to provide the market with a packing/padding element suitable for use with large-series products as well as small-lot objects, whereby storage space requirements for packing and/or padding materials at the point of packing shall be low, and disposal at the place of unpacking shall be as problem-free as possible.

These requirements are met by a padding element and a device for manufacturing this padding element having the characteristics and means as described in the claims.

The Padding Element in accordance with the present invention consists of two synthetic foil runs placed one on top of the other and joined by several welding seams running essentially at right angles to one another. The welding seams create at least one self-enclosed chamber per Padding Element. Each Padding Element consists of preferably several chambers. During the production process of the Padding Element each chamber can be filled with air as required. The Padding Element can thus be given an individual shape that is ideally suited to the object to be packed, i.e. by filling the relevant chambers a little, a lot or not at all. The adaptability of the Padding Element to the object to be packed is further enhanced by fact that the length and width of the chambers can also be varied. Padding Elements that consist of one or only a few air-filled chambers can be used as filler elements in place of Styropor chips.

Whenever possible, the Padding Elements are to be produced at the point of packing, i.e. a Padding Element Device is to be installed there. This means that the Padding Elements can be manufactured to meet current requirements, or at a rate matching that of the objects to be packed, and that storage space requirements for packing materials are kept as low as possible. Transport of packing materials from a warehouse to the packing stations thus becomes a chore of the past. The Padding Element Device is designed to provide relatively simple adjustment of the Padding Elements to the various requirements, and to the various shapes of the objects to be packed. By undertaking to keep the number of air-filled chambers on the Padding Element to the minimum required by the specific object to be packed, and by selecting the largest-possible chamber size for the job on hand, the disposal volume of the Padding Elements can be significantly reduced by cutting open the relatively small number of air-filled chambers.

Diagrammatic views have been compiled to assist in the definition of the invention:

Figure 1:
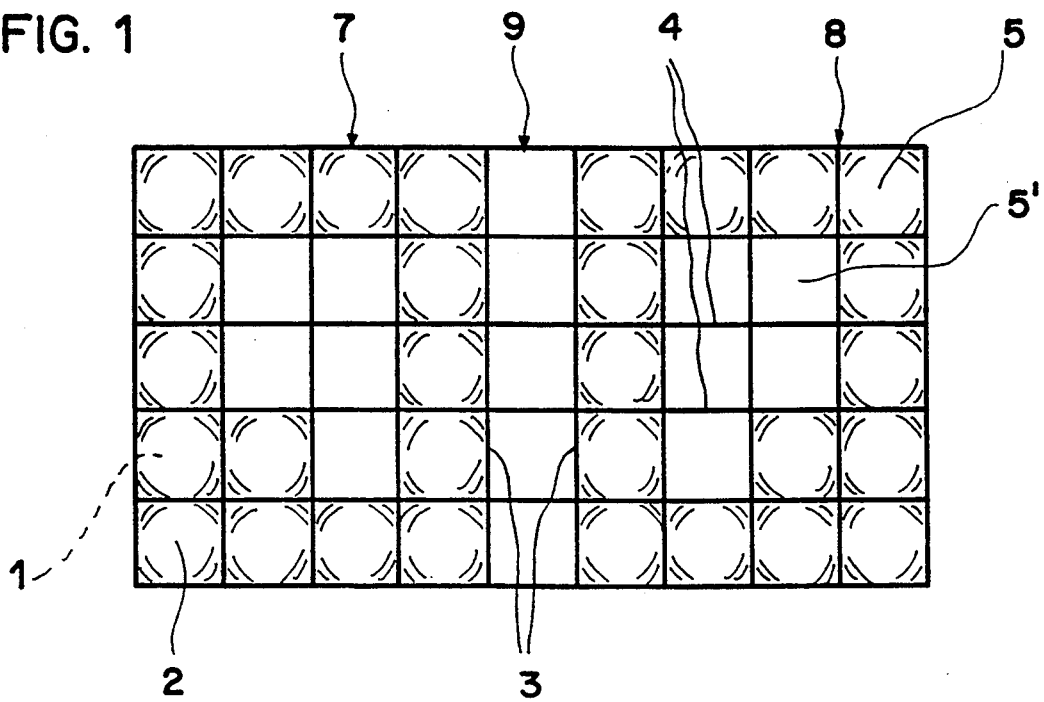
FIG. 1 shows a top view of a Padding Element in accordance with the present invention with some chambers inflated in an unfolded state.
Figure 2:
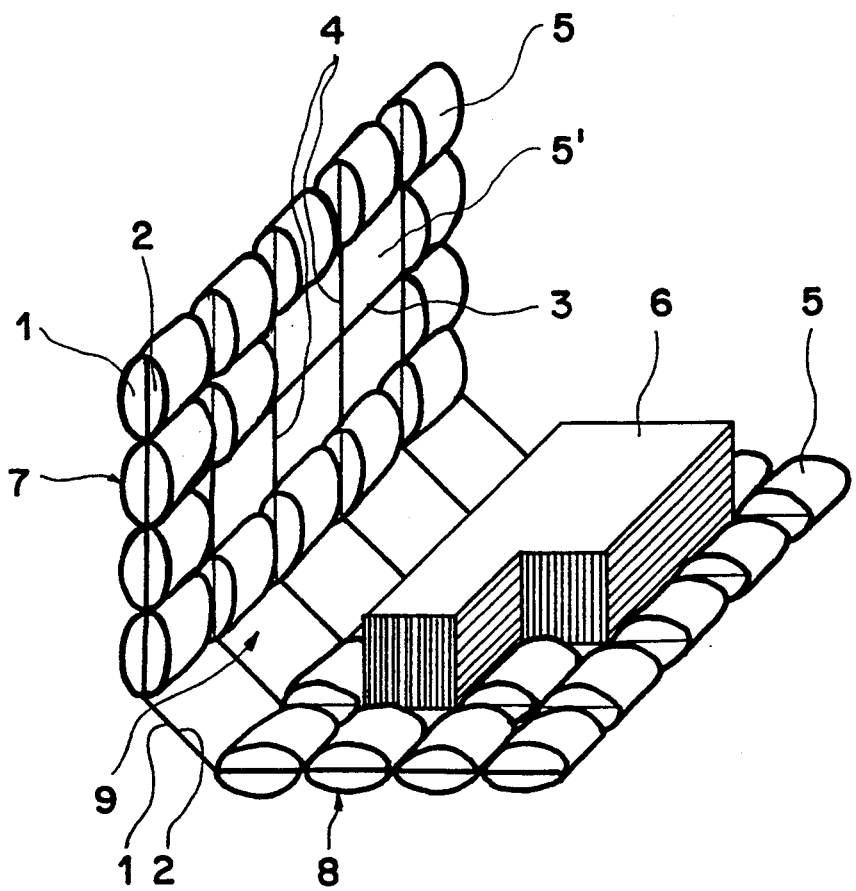
FIG. 2 shows an isometric view of the Padding Element shown in FIG. 1, in partially folded position with an object to be packed.

FIGS. 1 and 2 show a Padding Element in accordance with the present invention, the configuration of which has been adapted to an object to be packed 6. The Padding Element comprises a first synthetic foil run 1 and a second synthetic foil run 2 which have been positioned one on top of the other and welded together. The welding points are first welding seams 3 and second welding seams 4; they intersect approximately at right angles and in this example run over the entire length and width of the Padding Element. In each case two adjacent first welding seams 3 and in each case two adjacent second welding seams 4 enclose a four-cornered chamber 5, 5'. Each chamber 5, 5' created in this manner can either remain non-inflated 5' or be partially or entirely 5 filled with air. The Padding Element is preferably manufactured with the following configuration: the chambers 5' that are to be located beneath the base area and/or on the top area of the object to be packed should remain empty, whilst the chambers 5 that are to enclose the side areas of the object should be partially or entirely filled with air. This creates an impression in the side of the Padding Element facing the object to be packed 6 corresponding to or adapted to the shape of the object, thus embedding the object, whilst on the Padding Element side that does not come into contact with the object to be packed the air-filled chambers create pads projecting away from the object. Optimum packing is achieved if, as shown in the example, the Padding Element has the configuration of a book cover, i.e. with a top cover 7, a bottom cover 8 and a back 9. Due to the fact that the chambers that make up the back 9 remain empty the Padding Element can be comfortably folded. The object to be packed 6 is embedded in the impressions both in the top cover 7 as well as in the bottom cover 8 created by the empty chambers 5' (mirror-inverted to back 9).

The spacings between the first welding seams 3 as well as between the second welding seams 4 can be varied, which means that the size of the individual chambers can be selected as required. Chamber size could also be varied by including individual welding seams that do not extend unbroken over the entire length and/or width of the Padding Element. The thickness of the Padding Element is determined by the size of the chambers and the degree of inflation of the same.

It is obvious that aforedescribed variability of the Padding Element in accordance with the present invention provides scope for the solution of virtually any packing, padding and/or space-filling problems, and that objects of virtually any shape can thus be individually accommodated. Packaging quality matches that achieved with moulded sections. The use of synthetic foils means that very little material is expended for packing purposes, and by cutting open the inflated chambers (of which there are relatively few), waste disposal volumes can be kept at an absolute minimum.

Figure 3:
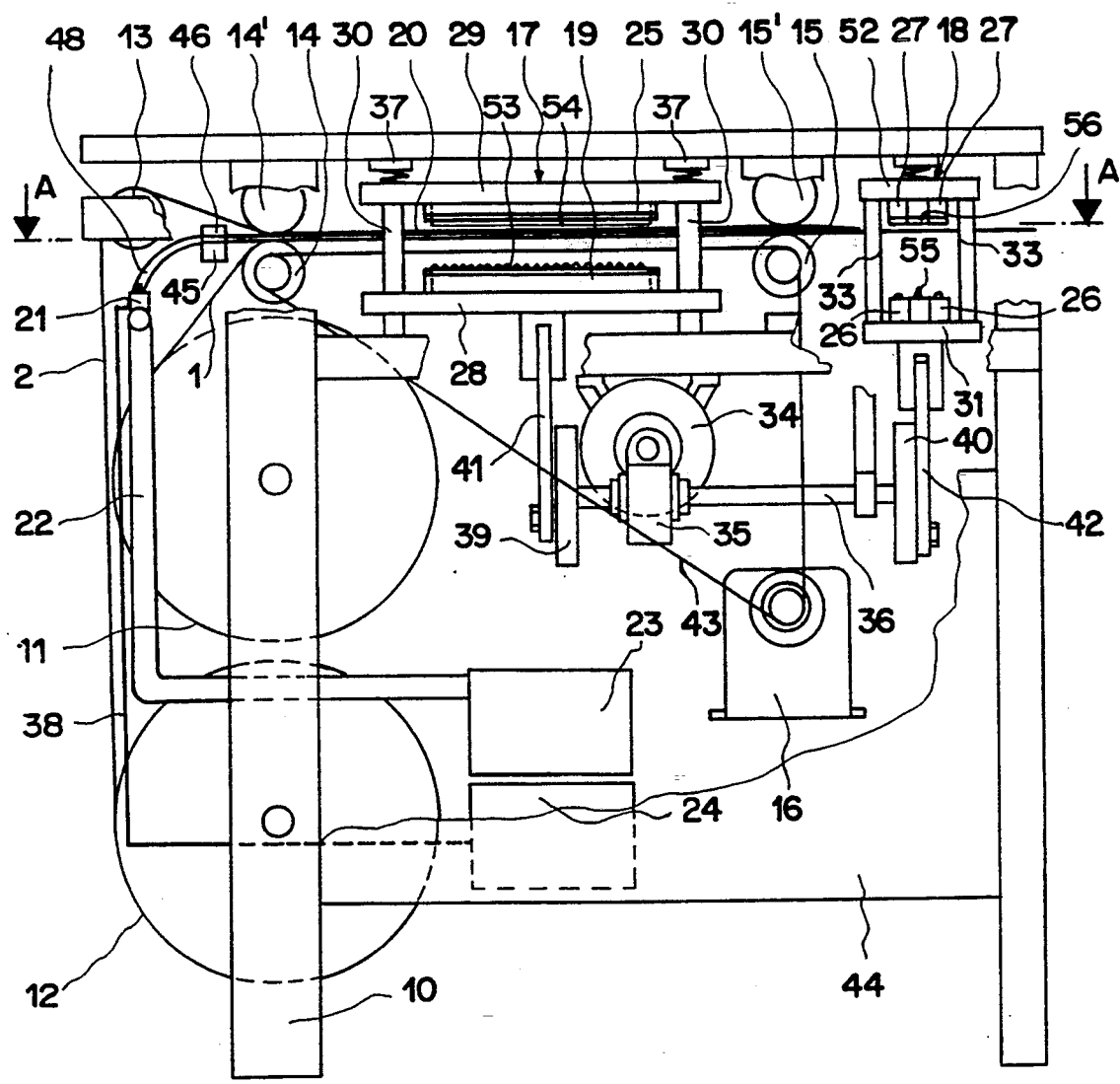
FIG. 3 shows a side view of a Device for the manufacture of Padding Elements in accordance with the present invention.
Figure 4:
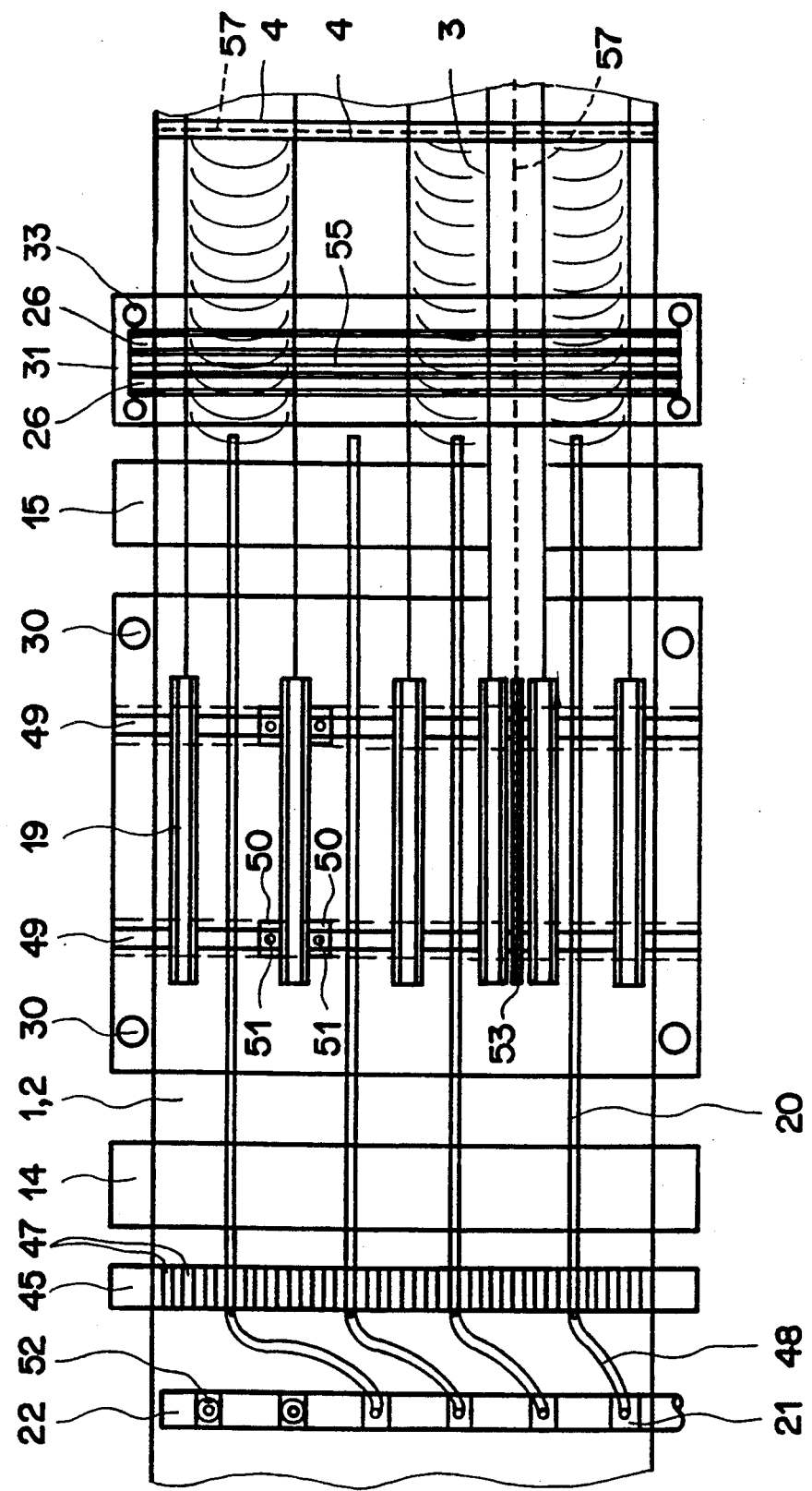
FIG. 4 shows a top view of the Device as shown in FIG. 3, relating to line A—A.

As previously stated, production of the Padding Element is best effected at the point of use. An example of a suitable Device in this context is depicted in FIGS. 3 and 4. FIG. 3 shows a side view, FIG. 4 is a top view with reference to line A—A in FIG. 3.10 is a partial representation of a Device mounting frame. In a section of the mounting frame 10 depicted on the left in FIG. 3, a first 11 and a second 12 foil roll, both rotating, are shown. These foil rolls supply the first 1 and the second 2 synthetic foil runs required in Padding Element manufacture. Depending on size and weight of the synthetic foil rolls 11, 12 they can be motor-driven (not shown in FIG. 3) to reduce drag on the foil runs 1, 2. 14, 14'; 15, 15' represent in each case two first and in each case two second drive rollers. They extend over the entire width of the Device, and are arranged one above the other so that the surface areas of the two first drive rollers 14, 14' and of the two second drive rollers 15, 15' are pressed against each other. The drive rollers provide step-by-step feed of the synthetic foil runs 1, 2 conducted through the rollers. In each case the lower drive rollers 14, 15 of the two drive roller pairs are driven by a belt 43 that is actuated for foil feed by an intermittently operating drive motor 16. The drive roller surfaces are covered with an elastic material, e.g. rubber or preferably a foamed material. 13 designates a deflection roller for the second synthetic foil run 2. The first and second drive rollers 14, 14' and 15, 15' are spaced from each other in the longitudinal or feed direction of synthetic foil runs 1, 2. A first welding station 17 is located between the first and second drive rollers, and a second welding station 18 is located after the second drive rollers 15, 15'. The first welding station 17 comprises a first lifting platform 28 on which several heatable welding rods 19 are situated. the welding rods run longitudinally to the synthetic foil runs 1, 2 and can be moved across the synthetic foil runs. The first lifting platform 28 can be raised and lowered longitudinally to the first rod guides 30. FIG. 3 shows it in its lowered position. The first rod guides 30 are attached to a counterpanel 29 located opposite the first lifting platform. In turn, the counterpanel 29 is connected via absorbing elements 37 to a part of the mounting frame 10 which serves as a cover panel. First welding rod counterpieces 25 are located on the first counterpanel 29, opposite the corresponding welding rods 19 and also movable across the synthetic foil runs 1, 2. The synthetic foil runs are conducted between welding rods 19 and the first welding rod counterpieces 25. 53 and 54 designate a cutting system. In the example, a toothed cutter 53 and a cutter counterpiece 54 provide perforated/cutoff lines 57, 58 between two first welding seams 3, virtually simultaneously with the creation of the first welding seams 3. The length of the toothed blade of cutter 53 preferably corresponds closely to the length of chambers 5 of the Padding Elements to be produced. The toothed blade of cutter 53 is designed so that, depending on the advance travel of the latter, only a perforation 57 of the two foil runs is effected between two first welding seams 3 or, in the case of longer advance travel, a cutoff line 58 extending over the entire length of the cutter blade 53. It has become apparent that if aforementioned cutoff lines are applied on both sides of each of the chambers 5 the latter are particularly easy to inflate. Naturally, this means that in each case two welding rods 19 and in each case two welding rod counterpieces 25 are located very close to the cutter 53. A cutoff line extending almost completely over the entire length of the chambers to be created, between two closely adjacent first welding seams 3, can also be achieved with a wire that can be briefly heated up to a high temperature by way of current pulse. In a desirable configuration it is possible to arrange in each case two closely adjacent and parallel running welding rods 19, with the heatable wire used to cut off the foil runs located in between, jointly on a single welding terminal.

The second welding station 18 is of similar configuration. It comprises a second lifting platform 31 located raisable and lowerable via the second rod guides 33. Two welding rods 26 are fitted across the synthetic foil runs 1, 2 on the second lifting platform 31. A second counterpanel 32 is connected to mounting frame 10, analogously to the first counterpanel. The second counterpanel 32 is equipped with two second welding rod counterpieces 27 for welding rods 26 of the second welding station 18.55 and 56 designate a second cutoff contrivance. A heatable wire 55 suitable for synthetic foil run 1, 2 cutoff is located between the two welding rods 26 on the second lifting platform 31. A heatable wire counterpiece 56 is situated between the two welding rod counterpieces 27 of the second counterpanel 32, opposite heatable wire 55.

34 designates a lifting platform motor, used to raise and lower lifting platforms 28, 31. Motor 34 drives an eccentric drive shaft 36 via transmission 35. An eccentric disk 39, 40 is located at each end of the shaft. A first connecting rod 41 is eccentrically mounted on bearings to the first eccentric disk 39 which is located beneath the first lifting platform 28. The other end of connecting rod 41 is connected pivotable to the first lifting platform 28. A second connecting rod 42 is eccentrically mounted on bearings to the second eccentric disk 40. This connecting rod is connected to the second lifting platform 31, again pivoting. The rotation of the eccentric disks 39, 40 causes the two lifting platforms 28, 31 with the welding rods 19, 26 to be periodically raised and lowered. When raised, the two sandwiched synthetic foil runs 1, 2 are given the first welding seams 3 in the first welding station 17, and in the second welding station 18 the second welding seams 4 are applied, which run essentially at right angles to the first welding seams. If the Device is equipped accordingly, aforedescribed perforated/cutoff lines 57, 58 are also applied at the first welding station. In the second welding station 18, where normally only one or both of the second welding rods 26 is/are activated to provide a second welding seam 4 or two parallel second welding seams 4, and simultaneously with the activation of the two welding rods 26, if a Padding Element is to be cut off the heatable wire 55 is heated up via current impulse so that synthetic foil runs 1 and 2 are severed. In place of heatable wire 55 and heatable wire counterpiece 56 it is intended to equip also the second welding station 18 with a toothed cutter and a cutter counterpiece which also both extend essentially over the entire width of the Padding Element to be produced. In this latter case, therefore, it is thus possible, by activating the two of the second welding rods 26 at every welding process, to provide after each chamber 5 a perforation 57 extending between the two parallel-running welding seams 4 over the entire width of the Padding Element, whereby variously sized Padding Elements can thus be torn off as required.

Figure 5:
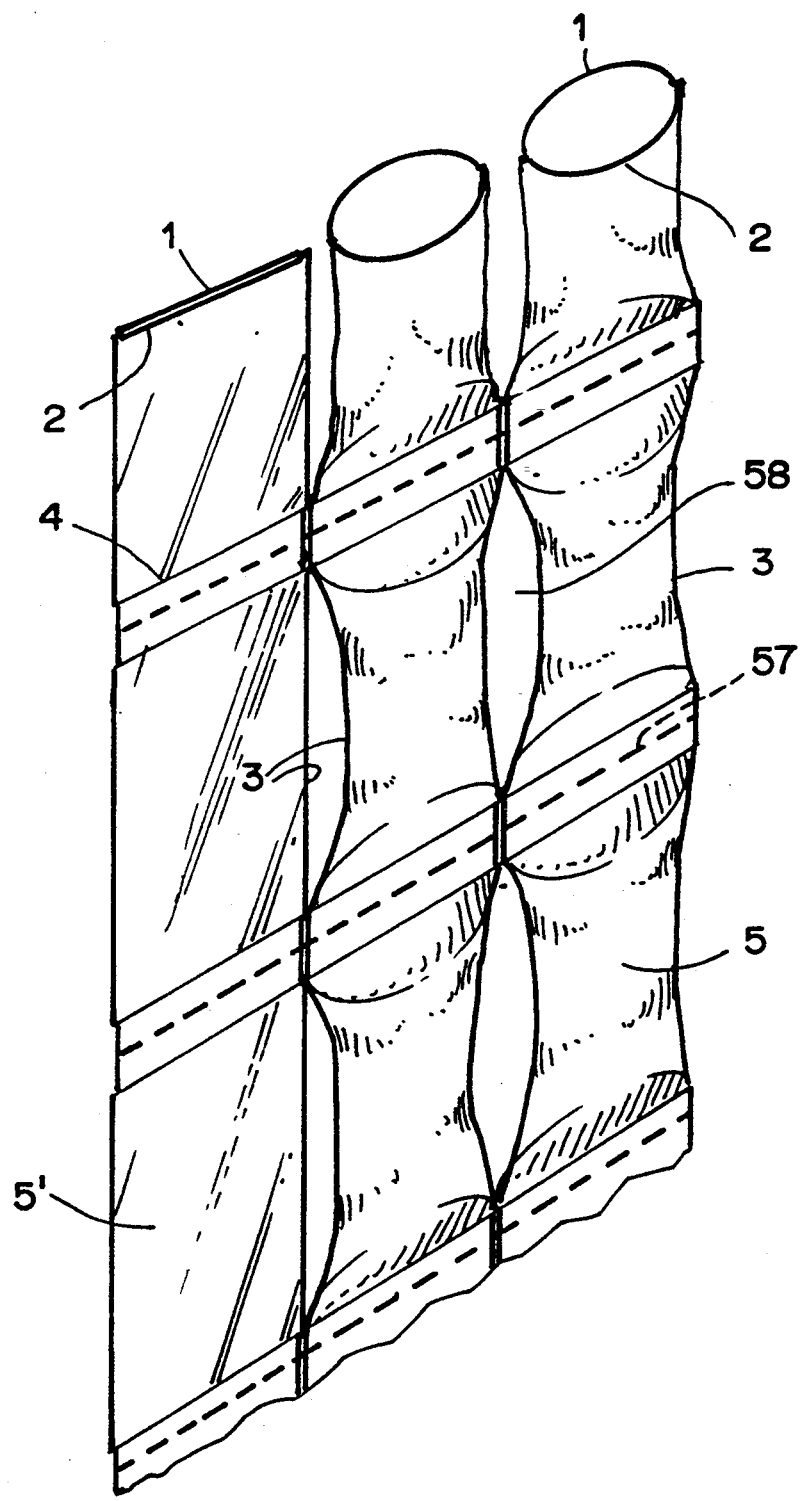
FIG. 5 shows an isometric view of a further Padding Element configuration.

An example with aforedescribed cutoff lines 58, which extend parallel to the first welding seams 3 almost over the entire length of the chambers 5, and with aforedescribed perforations 57, which extend parallel to the second welding seams 4 over the entire width, is depicted in FIG. 5. Very full inflation of the chambers 5 is made possible by the presence of these cutoff lines in that constriction points running in the direction of the first welding seams 3 are able to form during inflation at each of the chambers.

Drive motor 16 for synthetic foil feed is controlled by a control unit 24 in a manner ensuring that no feed takes place during the welding process. After the two lifting platforms 28, 31 have been lowered the synthetic foil runs 1, 2 are advanced as far as required to obtain a specific chamber length. The width of the chambers can be set by way of cross-adjustment of the welding rods 19 of the first welding station 17. As shown in FIG. 4, this preferably requires the presence of in each case two dovetail grooves 49 in the first lifting platform 28 as well as in the counterpanel 29, along which the welding rods 19/the first welding rod counterpieces 25 are adjustable. The set position of each welding rod 19/of each welding rod counterpiece 25 can be fixed by way of sliding blocks 50 equipped with detents 51.

Running in longitudinal direction between the first and second synthetic foil runs, air feed tubes 20 extend essentially from the first drive rollers 14, 14' to the second drive rollers 15, 15'. The air feed tubes 20 are clamped in place in front of the first drive rollers 14, 14' before the first and the second synthetic foil runs 1, 2 are placed upon each other, between an upper 46 and a lower fixing point 45, whereby they are located across the synthetic foil runs and spaced in a manner so that in each case one of the air feed tubes 20 runs between two adjacent welding rods 19 or welding rod counterpieces 25 of the first welding station 17. At least one of aforementioned fixing points 45, 46 is equipped with longitudinal grooves 47 in which the air feed tubes 20 can be inserted to fix their position. On the side of the fixing points 45, 46 facing away from the drive rollers 14, 14' the air feed tubes 20 project at least far enough to enable a hose 48 to be fitted over each projecting nozzle. Each other end of each hose 48 is connected to in each case one valve 21 which is in turn connected to each of the air feed tubes 20. The valves 21 are all allocated to a central air supply pipe 22 which leads to an overpressure-generating ventilator 23 or to a compressed air source. Each of the valves 21 can for example be executed as an electromagnetic valve, each connected via a control cable 38 with control unit 24. By individually addressing one or several of the valves 21 one or more of the chambers to be created can be filled more or less fully with air immediately prior to a welding process, depending on how high the overpressure is and how far or how long each of the valves is opened.

The surface areas of in particular the second drive rollers 15, 15' are of elastic structure; they thus can adapt to the air feed tubes 20 and prevent air from escaping, essentially in the direction of the first drive rollers 14, 14'.

The outputs of the valves 21 not required in the making of a corresponding Padding Element can be plugged with sealing caps 52. The mounting frame 10 can be cladded by means of cover panels 44.

It is of course possible to provide further automation for the functions of the Device for the manufacture of Padding Elements described here. Thus for example the control unit 24 could be executed in a programme-controlled version, whereby a specific manufacturing programme would be allocated to a specific Padding Element. This programme would provide automatic modification of the spacings between welding rods 19/welding rod counterpieces 25 of the first welding station, of the arrangement of air feed tubes 20, and of foil advance to be run between two welding processes. The air feed through the individual air feed tubes for inflation of the chambers to be created could also be programme-controlled. Furthermore, in addition to overpressure-generating ventilator 23—by which air can be pumped in a controlled manner through the individual air feed tubes 20 via the valves 21—a suction pump could be provided together with the requisite control valves to extract any residual air from between the foils at points just in front of the chambers that are to remain empty. Of course, in this case the described valves 21 and the additional valves required for such an additional suction pump would have to be counterlockable.

I claim:

1. Padding element for the packaging of objects, comprising two synthetic foil layers arranged one over the other and joined by means of welding seams, the welding seams comprising at least two adjacent first and at least two adjacent second welding seams which intersect, wherein each two adjacent first welding seams and each two adjacent second welding seams are sealed along lengths and widths to enclose corner-shaped chambers, at least one of the chambers being partially filled with air, and wherein cutoff lines are provided at least between said two adjacent first welding seams, the cutoff lines extending over the length of the adjacent chambers.

2. Padding element according to claim 1, wherein at least selected chambers are at least partially filled with air to effect adjustment to the contours of an object to be packed.

3. Padding element according to claim 1, comprising a top cover, a back cover and a bottom cover attached in the shape of a book cover to enclose an object to be packed on at least three sides and wherein the chambers forming the back are essentially void of air.

4. Padding element according to claim 1, wherein the lengths of said at least two first welding seams are unequal.

5. Padding element according to claim 4, wherein the lengths of said at least two second welding seams are unequal.

6. Padding element according to claim 5, wherein cutoff lines are provided between at least two of the second welding seams.

7. Padding element according to claim 6, wherein at least some of said cutoff lines comprise perforations.

8. Padding element according to claim 6, wherein at least some of said cutoff lines extend substantially over the width of adjacent chambers.

9. Padding element according to claim 1, wherein at least some of said cut off lines are cut on both sides of a chamber.

10. Device for the manufacture of a padding element, comprising at least one contrivance for synthetic foil feed and one contrivance for synthetic foil welding, wherein the contrivance for synthetic foil welding comprises a first welding station which applies first welding seams running longitudinally to a synthetic foil run, followed by a second welding station which applies second welding seams approximately at right angles to the first welding seams, wherein the first welding station has several welding rods arranged essentially parallel to one another, a cutoff contrivance being disposed at least between two welding rods of said several, wherein two first and two second drive rollers are installed in front of the first welding station as well as in front of the second welding station to conduct foil runs and wherein air feed tubes are provided, running from in front of the first drive rollers to after the second drive rollers in a longitudinal direction to the synthetic foil runs, one each of the air feed tubes running between two each of the adjacent welding rods.

11. Device according to claim 10, wherein each of the air feed tubes is connected to a central air supply pipe/ventilator via a valve.

12. Device according to claim 11, further comprising a control unit to set said valve to an open position prior to each operation of the second welding station.

13. Device according to claim 10, wherein the welding rods of the first welding station and the air feed tubes are transversely moveable in the longitudinal direction of the synthetic foil runs.

14. Device according to claim 10, further comprising means to impose a force upon said first and upon said second driver rollers having surface areas to cause said surface areas of said rollers to be pressed against each other, at least one of said surface areas of said first or said second drive rollers being equipped with an elastic covering.

15. Device according to claim 14, wherein said elastic covering comprises rubber or a foam material.

16. Device according to claim 10, wherein the cutoff contrivance comprises a cutter and cutter counterpiece.

17. Device according to claim 10, wherein the cutoff contrivance comprises a heating wire and a heating wire counterpiece.

18. Device according to claim 10, wherein the second welding station comprises two second welding rods and at least a further cutoff contrivance disposed between the second welding rods.

* * * * *